(12) United States Patent
Chang et al.

(10) Patent No.: US 8,994,315 B2
(45) Date of Patent: Mar. 31, 2015

(54) MOTOR CONTROLLER

(71) Applicants: Wei-Hsu Chang, New Taipei (TW);
Jo-Yu Wang, New Taipei (TW);
Jen-Hung Chi, Taichung (TW)

(72) Inventors: Wei-Hsu Chang, New Taipei (TW);
Jo-Yu Wang, New Taipei (TW);
Jen-Hung Chi, Taichung (TW)

(73) Assignee: Richtek Technology Corporation,
Chupei, HsinChu (TW)

( * ) Notice: Subject to any disclaimer, the term of this patent is extended or adjusted under 35 U.S.C. 154(b) by 197 days.

(21) Appl. No.: 13/786,823

(22) Filed: Mar. 6, 2013

(65) Prior Publication Data

US 2014/0252995 A1    Sep. 11, 2014

(51) Int. Cl.
*H02P 25/06*    (2006.01)
*H02P 7/29*    (2006.01)

(52) U.S. Cl.
CPC ........................................ *H02P 7/29* (2013.01)
USPC ........................................... 318/687; 318/135

(58) Field of Classification Search
CPC ....................................................... H02P 25/06
USPC .................. 318/807–811, 119, 135, 686, 687
See application file for complete search history.

(56) References Cited

U.S. PATENT DOCUMENTS

| 3,662,247 | A | * | 5/1972 | Schieman | 363/41 |
| 4,123,692 | A | * | 10/1978 | Gilmore et al. | 363/41 |
| 5,068,777 | A | * | 11/1991 | Ito | 363/97 |
| 5,640,322 | A | * | 6/1997 | McCafferty et al. | 701/51 |
| 7,177,166 | B1 | * | 2/2007 | Kris | 363/41 |

* cited by examiner

*Primary Examiner* — Bentsu Ro
(74) *Attorney, Agent, or Firm* — Tung & Associates

(57) ABSTRACT

The present invention provides a motor controller for controlling a DC motor according to a reference signal. The motor controller includes a compensator, a pulse width modulation unit, and a motor driving unit. The compensator generates a control signal according to the reference signal and a sensing signal from the DC motor. The pulse width modulation unit generates a motor control signal by comparing the control signal and a ramp signal having a varying frequency. The motor driving unit receives the motor control signal and drives the DC motor according to the motor control signal.

9 Claims, 5 Drawing Sheets

MOTOR CONTROLLER

BACKGROUND OF THE INVENTION

1. Field of Invention

The present invention relates to a motor controller, in particular a motor controller generating a pulse width modulation (PWM) signal with a spread spectrum to reduce the generated electromagnetic interference (EMI).

2. Description of Related Art

Referring to FIG. 1, a prior art motor controller 10 is shown. The motor controller 10 includes a compensator 11, a pulse width modulation unit 12, and a motor driving unit 13. The compensator 11 receives a reference signal Sref and a sensing signal from an external direct current motor, and generates a control signal Vc which is sent to the pulse width modulation unit 12; the motor driving unit 13 controls the external direct current motor according to the PWM signal generated by the pulse width modulation unit 12. The high frequency band of the PWM signal generated by the pulse width modulation unit 12 could cause EMI, and the direct current motor controlled by the PWM signal could be another source for generating EMI; for example, the operation of the direct current motor in a mobile phone for adjusting a focus of a lens could cause EMI to interfere signal reception. Conventional solutions to this problem include adding a shielding housing to isolate the electromagnetic wave, or adding an anti-EMI component, etc. These solutions might be effective but they inevitably increases the cost and consumes more materials. Another prior art solution is to reduce portion of the signal in the high frequency band as it is transformed by Fourier transformation; this solution might improve the EMI, but it changes the waveform and thus causes efficiency or precision problem in certain operational ranges.

Therefore, a solution for reducing the EMI, which does not require any extra component except the circuit itself and does not affect the overall efficiency and precision, is highly desired.

SUMMARY OF THE INVENTION

The objects and benefits of the present invention can be further understood by the following disclosed technique.

In one aspect, the present invention provides a motor controller for controlling a direct current motor according to a reference signal. The motor controller includes a compensator, a pulse width modulation unit, and a motor driving unit. The compensator generates a control signal according to the reference signal and a sensing signal from the direct current motor. The pulse width modulation unit generates a motor control signal by comparing the control signal and a ramp signal having a varying frequency. The motor driving unit drives the direct current motor according to the motor control signal.

In a preferable embodiment of the present invention, the pulse width modulation unit includes a spread spectrum oscillator and a first comparator. The spread spectrum oscillator is for generating the ramp signal having the varying frequency, and the first comparator is for generating the motor control signal by comparing the ramp signal having the varying frequency and the control signal.

In a preferable embodiment of the present invention, the spread spectrum oscillator includes an adjustable current source, a switch, a capacitor, and a second comparator, wherein the adjustable current source controls the charging or discharging operation of the capacitor according to an operation of the switch, and the second comparator has an input terminal coupled to the capacitor, an output terminal coupled to a reference voltage, and an output terminal controlling the operation of the switch.

In a preferable embodiment of the present invention, the adjustable current source includes a variable current source and a constant current source in parallel connection, and the current supplied by the constant current source is higher than the current supplied by the variable current source.

In a preferable embodiment of the present invention, the adjustable current source the adjustable current source provides a current which varies randomly, or which follows a predetermined increasing/decreasing waveform.

In another preferable embodiment of the present invention, the spread spectrum oscillator includes a current source, a switch, a variable capacitor, and a second comparator, wherein the adjustable current source controls the charging or discharging operation of the variable capacitor according to an operation of the switch, and the second comparator has an input terminal coupled to the capacitor, an output terminal coupled to a reference voltage, and an output terminal controlling the operation of the switch.

In a preferable embodiment, the variable capacitor has a capacitance which varies randomly, or varies according to a predetermined increasing/decreasing form.

In a preferable embodiment, the direct current motor is a voice coil motor.

In a preferable embodiment, the reference signal is a current signal or a voltage signal.

The objectives, technical details, features, and effects of the present invention will be better understood with regard to the detailed description of the embodiments below, with reference to the drawings.

DESCRIPTION OF THE PREFERRED EMBODIMENTS

The drawings as referred to throughout the description of the present invention are for illustrative purpose only, but not drawn according to actual scale. The orientation wordings in the description such as: above, under, left, or right are for reference with respect to the drawings, but not for limiting the actual product made according to the present invention.

Figure 1:
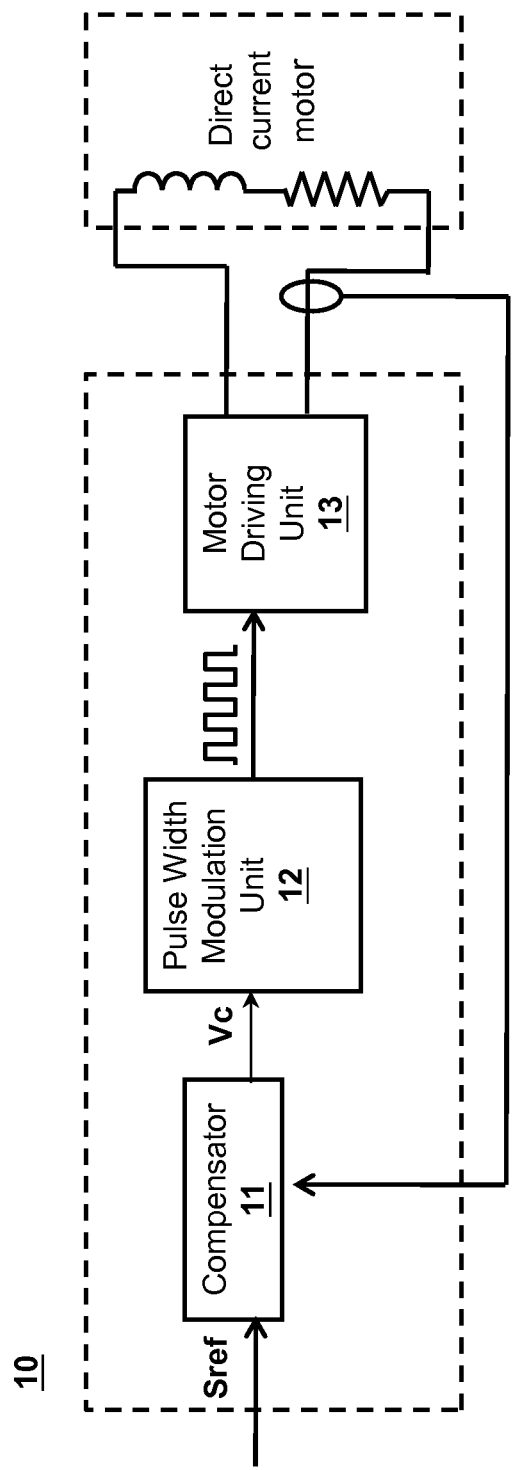
FIG. 1 shows a prior art motor controller.
Figure 2:
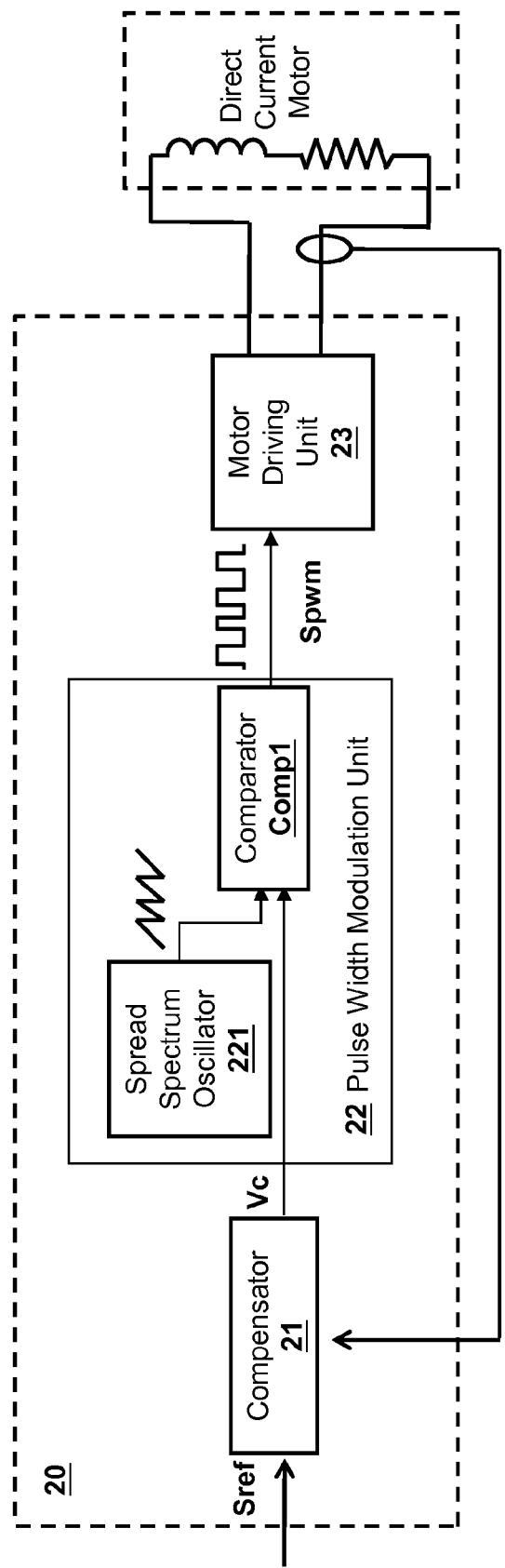
FIG. 2 shows a preferable embodiment of the motor controller according to the present invention.

FIG. 2 shows an embodiment of the motor controller 20 according to the present invention, which includes a compensator 21, a pulse width modulation unit 22, and a motor driving unit 23. The compensator 21 generates a control signal Vc according to a reference signal Sref and a sensing signal from the direct current motor, and transmits the control signal Vc to the pulse width modulation unit 22. The sensing signal for example can be, but not limited to, a current sensing signal, or a position sensing signal. The pulse width modulation unit 22 receives the control signal Vc and generates a motor control signal Spwm which is a PWM signal and is sent to the motor driving unit 23. The motor driving unit 23 drives the direct current motor according to the motor control signal Spwm. One feature of the present invention is that the frequency of the motor control signal Spwm has a spread spectrum, so that EMI can be reduced. In detail, the pulse width modulation unit 22 includes a spread spectrum oscillator 221 and a first comparator Comp1, wherein the spread spectrum oscillator 221 generates the ramp signal with a variable frequency, and the first comparator Comp1 generates the motor control signal Spwm by comparing the ramp signal of variable frequency with the control signal Vc. Therefore, the frequency of the generated motor control signal Spwm is variable and the EMI is thus reduced.

Still referring to FIG. 2, the reference signal Sref can be a current signal, a voltage signal, or a signal in any other form, which can be decided according to the practical need. For example, when the reference signal is a current signal, the reference signal Sref can be compared with a current sensing signal from the direct current motor to generate the control signal. In another embodiment, the reference signal can be a voltage signal and compared with a voltage signal converted from the current sensing signal of the direct current motor, to generate the control signal.

Figure 2A:
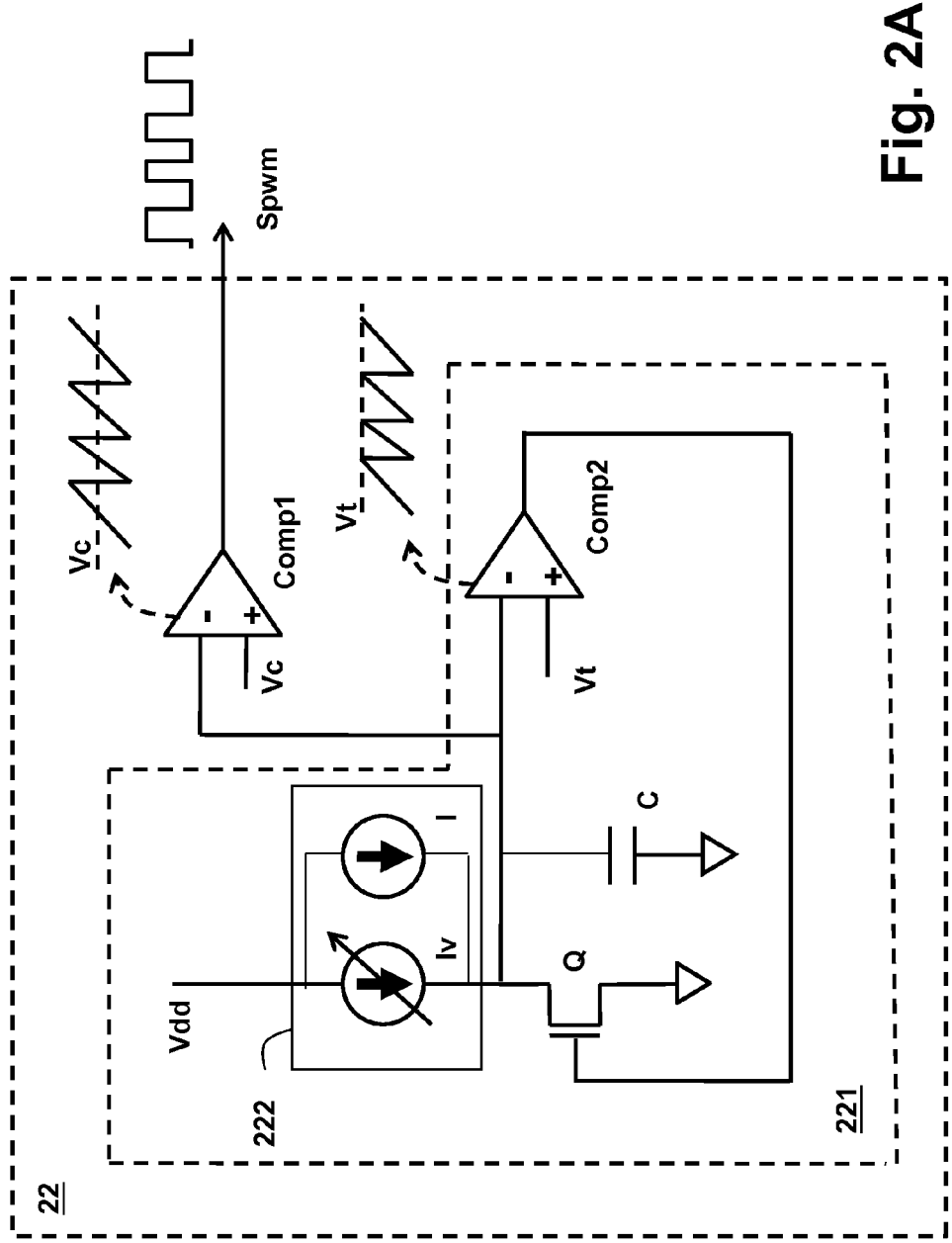
FIGS. 2A, 2B, and 2C show several preferable embodiments of the pulse width modulation units according to the present invention and the ramp signal generators therein.

FIG. 2A shows an embodiment of the pulse width modulation 22, wherein the spread spectrum oscillator 221 can be a ramp signal generator with adjustable clock frequency. In the present embodiment, the spread spectrum oscillator 221 includes an adjustable current source 222, a switch Q, a capacitor C, and a second comparator Comp2. The adjustable current source 222 is coupled between a voltage source Vdd and a common node which is coupled to the switch Q, the capacitor C, and an input terminal of the second comparator Comp2. The capacitor C is charged by the adjustable current source 222 under control by the on/off status of the switch Q. The second comparator Comp 2 has one input terminal coupled to the capacitor C (that is, the common node) and another input terminal coupled to a reference voltage Vt, and the second comparator Comp 2 controls the on/off status of the switch Q according to the comparison between the voltage at the common node and the reference voltage Vt. When the voltage at the common node reaches the reference voltage Vt, the second comparator Comp2 turns on the switch Q to discharge the capacitor C; when the voltage at the common node is lower than the reference voltage Vt, the second comparator Comp2 turns off the switch Q to charge the capacitor C. The voltage at the upper end of the capacitor C (the aforementioned common node) is thus a ramp signal.

In one embodiment, the adjustable current source 222 includes a variable current source Iv and a constant current source I in parallel connection, to charge the capacitor C. When the current supplied by the variable current source Iv is higher, the time period required for the voltage at the upper end of the capacitor (the common node) to reach the reference voltage Vt is shorter. When the current supplied by the variable current source is lower, the time period required for the voltage at the upper end of the capacitor (the common node) to reach the reference voltage Vt is longer. Therefore, the frequency of the ramp signal can be controlled by the variable current source Iv. The current provided by the variable current source Iv can vary randomly, or follow a predetermined increasing/decreasing waveform. Because the frequency of the ramp signal varies, the motor control signal Spwm generated by the first comparator Comp1 according to the comparison between the ramp signal and the control signal Vc has a varying frequency. In another embodiment, the adjustable current source can include only the variable current source Iv but not the constant current source I. That the adjustable current source 222 includes the variable current source Iv and the constant current source I in parallel connection is only one of the embodiments to embody the present invention, wherein the current supplied by the constant current source I can be higher than the current supplied by the variable current source Iv, so that the overall current supplied by the adjustable current source 222 varies in a relatively small percentage.

Figure 2B:
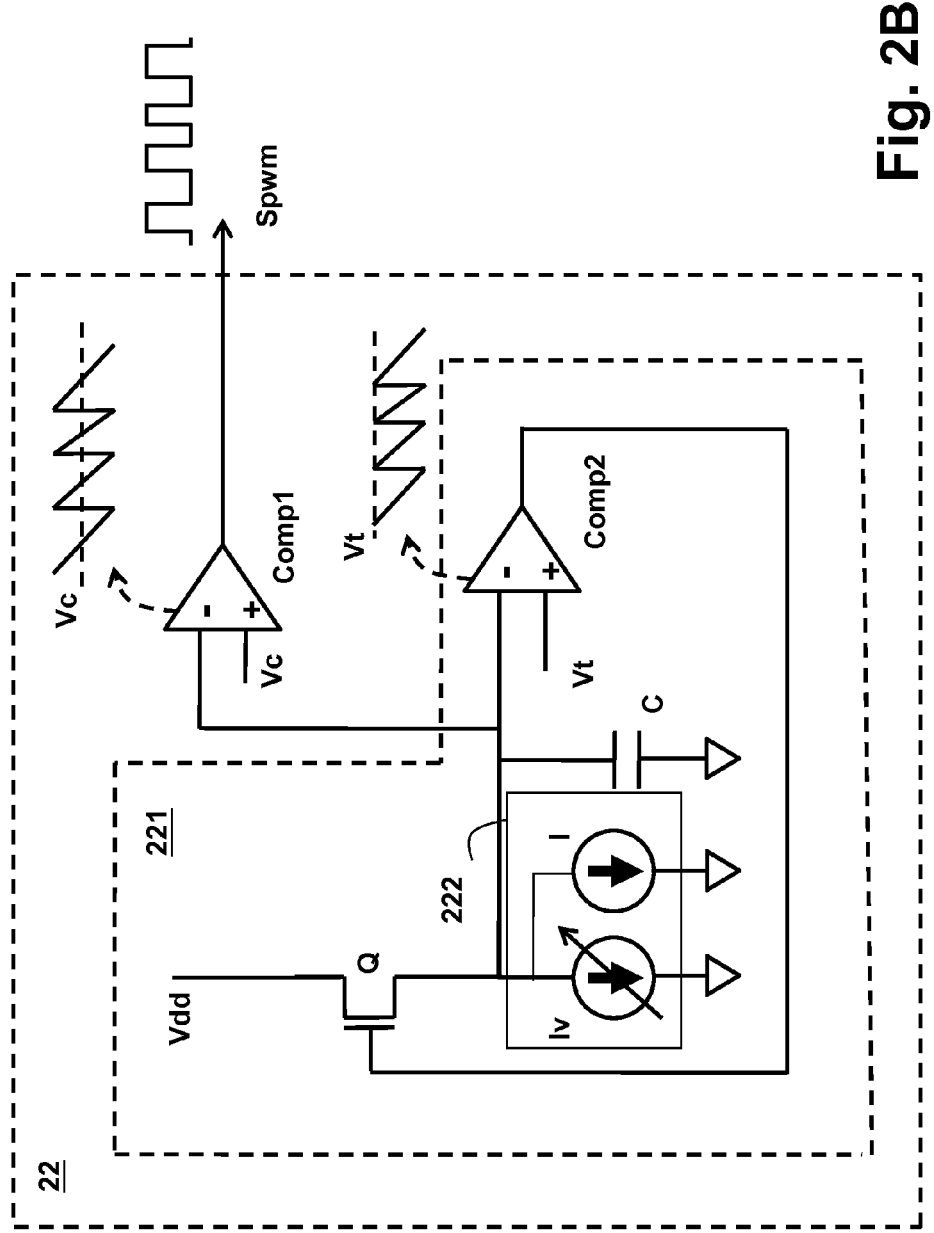

FIG. 2B shows another embodiment of the pulse width modulation unit 22 and the spread spectrum oscillator 221 therein. The main difference between FIGS. 2A and 2B is the different waveforms of the generated ramp signals; the ramp signal of the FIG. 2A rises from a low level to a high level, while the ramp signal of the FIG. 2B descends from a high level to a low level. In this embodiment, the on/off status of the switch Q is similarly controlled by the output of the second comparator Comp2, but with the difference that when the switch Q is turned on, the upper end voltage of the capacitor C is pulled up to the voltage source Vdd, and when the switch Q is turned off, the capacitor C discharges according to the current defined by the adjustable current source 222, so a descending ramp signal is generated. The discharge speed of the capacitor C varies according to the variable current through the adjustable current source 222, and therefore the frequency of the ramp signal is not constant. Similar to FIG. 2A, the adjustable current source 222 of FIG. 2B can include a variable current source Iv and a constant current source I in parallel connection, and the current supplied by the constant current source I can be higher than the current supplied by the variable current source Iv so that the overall current supplied by the adjustable current source 222 varies in a relatively small percentage.

Figure 2C:
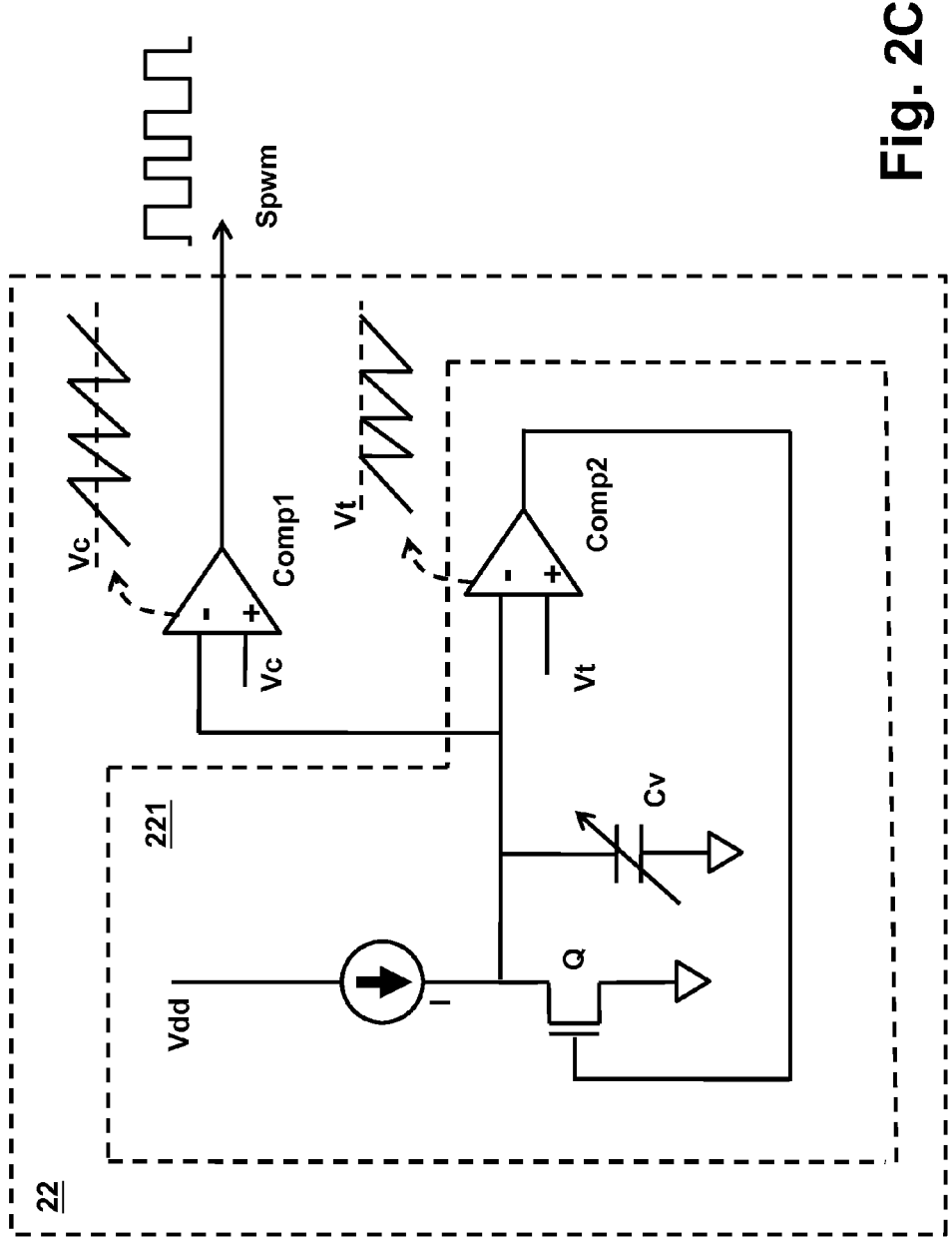

FIG. 2C shows another embodiment of the pulse width modulation 22 and the spread spectrum oscillator 221 therein. The spread spectrum oscillator 221 includes a constant current source I, a switch Q, a variable capacitor Cv, and a second comparator Comp2. The output terminal of the current source I, the switch Q, the variable capacitor Cv, and an input terminal of the second comparator Comp2 are coupled to a common node. The variable capacitor Cv is charged by the current source I when the switch Q is off or discharged through the switch Q when the switch Q is on. The second comparator Comp2 compares the voltage of the variable capacitor Cv and a reference voltage Vt, to control the on/off status of the switch. Compared to FIG. 2A, the ramp signal generator 221 of FIG. 2C does not include a variable current source Iv, but the capacitor C in FIG. 2A is replaced by a variable capacitor Cv. The charging and discharging time of the variable capacitor Cv is variable, so that the frequency of the generated ramp signal is variable. The capacitance of the variable capacitor Cv can be adjusted randomly, or according to a predetermined increasing/decreasing form.

In an embodiment of the present invention, the external direct current motor is for example a voice coil motor.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a circuit or device which does not affect the primary function can be inserted between two units shown to be in direct connection in the figures. For example, the positive input terminal and the negative input terminal of a comparator are interchangeable, with a corresponding amendment on the circuit or device processing these signals. For another example, the devices in the ramp signal generator are not limited to being connected exactly as the embodiments shown in the figures. An embodiment or a claim of the present invention does not need to attain or include all the objectives, advantages or features described in the above. The abstract and the title are provided for assisting searches and not to be read as limitations to the scope of the present invention.

What is claimed is:

1. A motor controller, for controlling a direct current motor according to a reference signal, comprising:
   a compensator, for generating a control signal according to the reference signal and a sensing signal from the direct current motor;
   a pulse width modulation unit, for receiving the control signal and comparing the control signal and a ramp signal having a varying frequency to generate a motor control signal, the pulse width modulation unit including a spread spectrum oscillator for generating the ramp signal having the varying frequency, and a first comparator for generating the motor control signal by comparing the ramp signal having the varying frequency and the control signal; and
   a motor driving unit, for driving the direct current motor according to the motor control signal;
   wherein the spread spectrum oscillator includes an adjustable current source, a switch, a capacitor, and a second comparator, wherein the adjustable current source controls the charging or discharging operation of the capacitor according to an operation of the switch, and the second comparator has an input terminal coupled to the capacitor, an output terminal coupled to a reference voltage, and an output terminal controlling the operation of the switch.

2. The motor controller of claim 1, wherein the adjustable current source includes a variable current source and a constant current source in parallel connection, the current supplied by the constant current source being higher than the current supplied by the variable current source.

3. The motor controller of claim 1, wherein the adjustable current source provides a current which varies randomly, or which follows a predetermined increasing/decreasing waveform.

4. The motor controller of claim 1, wherein the direct current motor is a voice coil motor.

5. The motor controller of claim 1, wherein the reference signal is a current signal or a voltage signal.

6. A motor controller, for controlling a direct current motor according to a reference signal, comprising:
   a compensator, for generating a control signal according to the reference signal and a sensing signal from the direct current motor;
   a pulse width modulation unit, for receiving the control signal and comparing the control signal and a ramp signal having a varying frequency to generate a motor control signal, the pulse width modulation unit including a spread spectrum oscillator for generating the ramp signal having the varying frequency, and a first comparator for generating the motor control signal by comparing the ramp signal having the varying frequency and the control signal; and
   a motor driving unit, for driving the direct current motor according to the motor control signal;
   wherein the spread spectrum oscillator includes a current source, a switch, a variable capacitor, and a second comparator, wherein the adjustable current source controls the charging or discharging operation of the variable capacitor according to an operation of the switch, and the second comparator has an input terminal coupled to the capacitor, an output terminal coupled to a reference voltage, and an output terminal controlling the operation of the switch.

7. The motor controller of claim 6, wherein the variable capacitor has a capacitance which varies randomly, or varies according to a predetermined increasing/decreasing form.

8. The motor controller of claim 6, wherein the direct current motor is a voice coil motor.

9. The motor controller of claim 6, wherein the reference signal is a current signal or a voltage signal.

* * * * *